United States Patent Office 2,864,861
Patented Dec. 16, 1958

2,864,861

PREPARATION OF METHYLOLACRYLAMIDE

Henry P. Wohnsiedler and Pierrepont Adams, Darien, Conn., assignors to American Cyanamid Company, New York, N. Y., a corporation of Maine No Drawing. Application June 5, 1956
Serial No. 589,363

6 Claims. (Cl. 260—561)

This invention relates to methylol derivatives of unsaturated, polymerizable, low melting amides. More particularly, it relates to the preparation of such methylol derivatives, especially methylol acrylamide. Still more particularly, it relates to the preparation of methylol acrylamide as a substantially pure crystalline monomer by the fusion of solid acrylamide and paraformaldehyde.

Various unsaturated organic amides have become of increased importance in various fields in recent years. Among these is methylol acrylamide and its polymerization and copolymerization products. These products have been shown to be potentially useful in various fields such as those of adhesives, fibers, surface coatings, paper, textiles, and the like. Because of these many possible applications, there has been a need for a suitable process for producing methylol acrylamide.

The early preparation of methylol acrylamide by the reaction of acrylamide with formaldehyde was run in water and the product recovered in aqueous solution, since acrylamide was generally prepared as an aqueous solution. One of the uses of methylol acrylamide is in the preparation of polymers for various purposes. Polymerization results of aqueous methylol acrylamide solutions, however, have been very erratic. Wide variations in characteristics of the polymer, e. g. viscosity, occur when the polymer is prepared from different lots of monomer and even when prepared from the same lot of monomer. From the viewpoint of transportation, stability and ease of handling in industrial use, methylol acrylamide in solid, crystalline form is to be preferred to an aqueous solution thereof. Methods of recovery in pure, solid form are therefore of industrial importance.

Solid methylol acrylamide can be isolated from an aqueous solution thereof but the methods do not lend themselves to large scale production and often result in the formation of polymeric products. It has also been demonstrated that when starting with a satisfactory grade of solid acrylamide, fairly good yields of crystalline methlol acrylamide can be obtained by reacting the acrylamide with paraformaldehyde in an alcohol solution. On completion of the reaction, the solution is cooled to crystallize the methylol acrylamide. While both yield and purity of product are good, nevertheless, the use of an organic solvent presents problems. For example, although not as soluble as in water, methylol acrylamide is quite soluble in methanol. To utilize this solvent effectively, it is necessary to operate near its boiling point, which is quite low. Thus the handling of such solutions in clarification and filtration operations requires special equipment and precautions. Solubility is somewhat lower in butanol, but the use thereof involves a drying porblem. Finally, the use of all organic solvents on a production scale requires a solvent recovery system.

It is an object of this invention to provide a process for preparing crystalline methylol acrylamide which is not subject to the various disadvantages noted above. It is a further object of this invention to provide a method for producing crystalline methylol acrylamide of high purity and in good yield so that polymerization products thereof may be readily reproduced. It is a further object of this invention to provide a process for producing crystalline methylol acrylamide which is straightforward and requires a minimum of supervision during operation.

These objects have been met in a simple yet surprisingly effective manner. It has been discovered, in accordance with this invention, that solid methylol acrylamide may be readily prepared in the absence of solvent and in quantitative yield by fusing crystalline acrylamide and paraformaldehyde. Although the process has been simply stated, nevertheless, the fact that methylol acrylamide can be obtained in this manner is quite unexpected and surprising in that acrylamide is ordinarily reactive and thermally unstable above its fusion temperature and is polymerizable by itself.

The condensation is conducted by mixing crystalline acrylamide and powdered paraformaldehyde in a suitable reaction vessel. Substantially equimolecular proportions of reactants may be employed. In the course of the reaction, the mixture becomes liquified and is preferably stirred constantly. The length of time required to complete the reaction will vary with the temperature employed. Little if any heat is evolved, however, regardless of the temperature. On completion of the reaction, the entire mass is crystallized by cooling.

During fusion there is preferably present in the mixture as a catalyst a basic material which is substantially unreactive therein. Illustrative of such materials which may be employed in this capacity are triethylamine, tri-n-propylamine, tri-n-butylamine, morpholine, diisobutylamine, diethylethanolamine, barium oxide, sodium borate, trisodiumphosphate, and the like either alone or in combination. Trialkylamines, however, especially triethylamine, have been found particularly effective and form a preferred embodiment of this invention.

Varying amounts of catalyst have been found effective for the purpose of this invention. In general, as little as 0.5% by weight of the acrylamide will be effective, although as much as 1.5% and even more may be employed. More than about 1.5%, however, provides for little if any added advantage. Preferably, therefore, from about 0.5–1.0% on the weight of the acrylamide will be used.

By the use of a catalyst, the condensation reaction may be surprisingly conducted at temperatures considerably below the melting point of acrylamide. Thus solid acrylamide, paraformaldehyde and a catalytic amount of triethylamine or the like may be mixed at a temperature below the melting point of acrylamide. If carried out at an average room temperature, the mixture liquifies in some 3–4 hours. In an additional 6–7 hours, the mixture resolidifies as methylolacrylamide. Temperatures higher than normal room temperature are preferable in as much as the reaction can be conducted in considerably less time. Thus at a temperature slightly above the melting point of acrylamide, the condensation is complete in about 15–30 minutes. Operating at temperatures in excess of about 100° C., however, is of little added advantage and increases the possibility of polymerization. If desirable, a polymerization inhibitor such as sodium nitrite may be incorporated in the mixture although there is little evidence of polymerization in its absence provided an elevated temperature is not maintained for too long a period of time.

The following examples further illustrate the invention:

*Example 1*

To a mixer is added 30 pounds of crystalline acrylamide, 13.1 pounds of paraformaldehyde and 140 cc. of triethylamine. The cover is closed, agitation started and the jacket temperature adjusted to 50° C. After 40 minutes the reaction mixture is fluid and in 2½ hours it resolidifies. Cold water is then turned into the jacket and the batch dumped 30 minutes later. The product is spread out on trays and exposed to the air overnight in a hood. The yield of product is 42.7 pounds melting at 70-73° C.

*Example 2*

71 grams of crystalline acrylamide and 31.6 grams of powdered paraformaldehyde are mixed together in a reaction vessel with 0.75 cc. of triethylamine. The reaction vessel is placed in boiling water and the mixture stirred. Fusion is complete at about 85° C. but the temperature continues to rise to about 95° C. where it is held for 15 minutes. The reaction mixture is cooled and the entire mass crystalized. The crystals are found to melt at a temperature of 71-75° C. Two grams of the product are dissolved in 10 ml. of water. The pH of this solution is found to be 10.1 with a glass electrode instrument. Determination of free formaldehyde indicates that the reaction is 95% complete.

*Example 3*

17.5 grams of acrylamide and 7.9 grams of paraformaldehyde are mixed together with 0.18 gram of diethylethanolamine in a flask and heated with steam while stirring. Fusion occurs at 75° C. After 25 minutes at 70-80° C., the liquid charge is cooled slowly. The crystalline product melts at 65-72° C.

*Example 4*

The procedure of Example 3 is repeated except that 0.18 gram of morpholine is employed as the catalyst, and heating is conducted for only 15 minutes. Substantially the same result is obtained.

We claim:

1. A method according to claim 6 in which the temperature during mixing is not greater than about 100° C.

2. A method according to claim 6 in which the temperature during mixing is room temperature.

3. A process according to claim 6 in which the catalyst is triethylamine.

4. A process according to claim 6 in which the catalyst is diethylethanolamine.

5. A process according to claim 6 in which the catalyst is morpholine.

6. A method of preparing solid polymerizable, monomeric methylol acrylamide in good yield without the formation of by-products which comprises: preparing a solid mixture comprising substantially equimolecular proportions of solid acrylamide and paraformaldehyde, said mixture having present therein a catalytic amount of a base unreactive in the mixture, agitating said mixture until it liquifies, continuing agitation until reaction is substantially complete, and recovering solid methylol acrylamide.

References Cited in the file of this patent
UNITED STATES PATENTS

| | | |
|---|---|---|
| 2,096,181 | Johrstorfer et al. | Oct. 19, 1937 |
| 2,268,395 | Henke et al. | Dec. 30, 1941 |
| 2,475,846 | Lundberg | July 12, 1949 |
| 2,713,594 | Sauer | July 19, 1955 |